United States Patent [19]

Basturk

[11] Patent Number: 5,343,318

[45] Date of Patent: Aug. 30, 1994

[54] LIQUID CRYSTAL CELL HAVING AN ALIGNMENT LAYER WITH A TEMPERATURE DEPENDENT TILT ANGLE

[75] Inventor: Naci Basturk, Hauterive, Switzerland

[73] Assignee: Asulab S.A., Bienne, Switzerland

[21] Appl. No.: 856,973

[22] Filed: May 28, 1992

[30] Foreign Application Priority Data

Sep. 21, 1990 [FR] France .................. 90-11782

[51] Int. Cl.$^5$ .................. G02F 1/1337; G02F 1/13
[52] U.S. Cl. .................. 359/75; 359/43; 359/44; 359/77; 359/78
[58] Field of Search .................. 359/75, 76, 77, 78, 359/99, 102, 43, 44, 45; 428/1, 421, 422

[56] References Cited

U.S. PATENT DOCUMENTS

| | | | |
|---|---|---|---|
| 4,533,215 | 8/1985 | Trias et al. | 359/72 |
| 4,879,059 | 11/1989 | Hayu et al. | 359/78 |
| 5,093,735 | 3/1992 | Doane et al. | 359/99 |
| 5,140,447 | 8/1992 | Kaneko et al. | 359/99 |
| 5,173,342 | 12/1992 | Sato et al. | 359/78 |
| 5,186,985 | 2/1993 | Estes et al. | 359/78 |
| 5,188,870 | 2/1993 | Brosig | 359/78 |
| 5,192,596 | 3/1993 | Hanyu et al. | 359/78 |
| 5,268,780 | 12/1993 | Hanyu et al. | 359/75 |

FOREIGN PATENT DOCUMENTS

| | | |
|---|---|---|
| 0217641 | 4/1987 | European Pat. Off. |
| 0317942 | 5/1989 | European Pat. Off. |
| 0363908 | 4/1990 | European Pat. Off. |
| 62-62332 | 3/1987 | Japan . |
| 2044538 | 2/1990 | Japan . |

Primary Examiner—William L. Sikes
Assistant Examiner—Kenneth Parker
Attorney, Agent, or Firm—Griffin Butler Whisenhunt & Kurtossy

[57] ABSTRACT

The liquid crystal cell with an alignment layer in the form of a soluble halogenated polymer of the ethylenic substituted ethylenic cycloaliphatic or heterocycloaliphatic type which induces homeotropic or planar alignment of the crystal molecules in contact therewith depending on whether the temperature is below or above a predetermined temperature $T_{HP}$. The alignment layer may be a copolymer of tetrafluoroethylene with bis-2,2-trifluoromethyl-4,5-difluoro-1,3-dioxide.

24 Claims, 10 Drawing Sheets

LIQUID CRYSTAL CELL HAVING AN ALIGNMENT LAYER WITH A TEMPERATURE DEPENDENT TILT ANGLE

The instant invention relates to a liquid crystal cell having two plates separated by a sealed frame defining a sealed volume containing an optically active material comprising at least one liquid crystal of which one of the optical characteristics can be modified when it is subjected to at least one predetermined constraint. More particularly it relates to a liquid crystal cell, the inner surface of at least one of the plates of which in contact with the optically active material has an alignment layer, whereby the nature of the alignment induced thereby varies as a function of temperature.

A liquid crystal cell generally comprises two plates between which is interposed a sealed frame to form a sealed volume containing liquid crystal molecules. Each plate has a set of electrodes covered by an alignment layer making it possible to induce a predetermined orientation to the liquid crystal molecules in the immediate vicinity of the plates. When no field is applied between the electrodes, the cell is in a predetermined optical state that is transparent or opaque, depending on the initial alignment of the liquid crystal and the optical element(s) (polarizers, dichroic dyestuffs . . . ) associated with the cell. When an electric voltage is applied the liquid crystal molecules change their orientation, causing the cell to pass into the complementary optical state.

There are two basic types of alignment between the alignment layers which are, namely on the one hand, planar alignment and, on the other hand, homeotropic alignment.

Planar alignment makes it possible to induce close to the plates an alignment of the liquid crystal molecules in a direction substantially parallel to their surface, whereas homeotropic alignment makes it possible to induce close to the plates an alignment of liquid crystal molecules in a direction substantially perpendicular to their surface, the liquid crystal molecules located in the remainder of the volume of the cell being aligned in the same direction, parallel to the surface or perpendicular to the surface depending on the alignment, by molecular interaction.

In practice, to ensure homogeneous tilting of the liquid crystal molecules in a single direction when an electric field is applied between the electrodes, a slightly inclined alignment is provided in relation to the surface of the plate in the case of planar alignment or in relation to the normal at the surface of the plate in the case of homeotropic alignment. This tilt can vary by some tenths of a degree to about 30°, depending on the nature of the liquid crystal used.

The smallest angles of tilt are obtained by brushing the alignment layer in the case of planar alignment and by brushing an underlayer to which surfactants are fixed in the case of homeotropic alignment.

For the largest angles of tilt, the alignment layer or the underlayer of alignment is deposited by vacuum deposition using a high angle of glancing incidence.

A polyimide is conventionally used to provide the planar alignment layer and $SiO_x$ with a surfactant of the octadecatrialkoxysilane type fixed thereon is used for the homeotropic alignment.

It has been found that polymers belonging to the group of soluble halogenated ethylenic polymers of the substituted ethylenic cycloaliphatic or heterocycloaliphatic type may advantageously be used as alignment layer and that, contrary to all expectations, the nature of the alignment induced by a layer of this type varies in reversible manner from a homeotropic alignment to a planar alignment as a function of temperature.

Conventional planar or homeotropic alignment layers are generally selected depending on their temperature stability. Hitherto known standard alignment layers give a constant alignment within the operating temperature range which is generally imposed by the liquid crystal used. In addition, the known electro-optical effects are based on the use of temperature-stable alignment layers.

It is thus an object of the invention to use this variation in the nature of the alignment as a function of temperature in a liquid crystal cell having a first plate, a second plate and a sealed frame disposed between the two plates to thereby form a sealed volume in which is contained an optically active material having at least one liquid crystal, one optical characteristic of which is capable of being modified when it is subjected to at least one predetermined constraint, at least one of said plates being covered by an alignment layer.

In accordance with the invention, said alignment layer comprises a polymer belonging to the family of soluble halogenated ethylenic polymers of the substituted ethylenic cycloaliphatic or heterocycloaliphatic type.

Using a material belonging to the above-mentioned group of polymers as an alignment layer, the liquid crystal cell can thus be switched over thermally between two optical states, for example transparent and opaque.

In other words, the nature of the liquid crystal alignment induced by this type of alignment layer varies in reversible manner from the homeotropic state to the planar state as a function of temperature, with the result that a liquid crystal cell of the invention presents a transparency which varies as a function of temperature and can be used without any special electrode or control circuit.

It will also be noted that, because of its solubility, this type of alignment can be deposited in a simple manner, for example by dipping or using a spin coating machine.

The soluble halogenated polymers defined hereinabove may notably be fluorinated polymers, perfluorinated polymers, cyclooxyaliphatic substituted polymers and for example a copolymer of tetrafluoroethylene with bis-2,2-trifluoromethyl-4,5-difluoro-1,2-dioxole.

Selection of fluorinated polymers of this type yields a transparent complex which is chemically and thermally stable and which is consequently well suited to use in the field of liquid crystal cells.

According to a preferred embodiment of the cell of the invention, the optical characteristic of the optically active material is controlled by a temperature constraint exerted on the alignment layer.

The transparency of the cell can therefore be controlled in the manner of a conventional cell, the control means consisting for example of a heating electrode being disposed either on the inside or on the outside surface of the plates of the cell or an infrared laser beam.

In another embodiment, the optical characteristic of the optically active material is electrically controlled by means of a voltage applied between the electrodes provided on each plate.

In this latter embodiment, the liquid crystal cell can be switched in two different ways, namely thermally when no voltage is applied between the electrodes, but the liquid crystal cell undergoes a rise or fall in temperature above or below a transition temperature (which will be described in greater detail hereinafter) and/or electrically by applying a voltage in a conventional manner to the electrode terminals to create an electric field between the latter.

According to another embodiment of the invention, the cell is electrically controlled and presents an alignment layer comprising a copolymer of tetrafluoroethylene with bis-2,2-trifluoromethyl-4,5-difluoro-1,2-dioxole associated with a liquid crystal, the ratio of the bend elastic constant to its elastic splay deformation constant ($K_3/K_1$) is greater than or equal to 1 at ambient temperature, the cell moreover presenting a ratio $T_{HP}/T_{NI}$ less than or equal to $\frac{1}{3}$.

This combination of characteristics yields an electrically controlled liquid crystal cell, the variation of its threshold voltage of which as well as of its saturation voltage with temperature is so well compensated that the electro-optical performances of the cell are maintained at a constant level independent of variations in temperature, and this without using a specific electronic circuit.

According to yet another embodiment of the invention, the cell is electrically controlled and presents an alignment layer comprising a tetrafluoroethylene copolymer with a bis-2,2-trifluoromethyl-4,5-difluoro-1,2-dioxole associated with a liquid crystal the ratio of its bend elastic deformation constant with its elastic splay deformation constant ($K_3/K_1$) is lower than or equal to 2 at ambient temperature, the cell also presenting a ratio $T_{HP}/T_{NI}$ greater than or equal to $\frac{2}{3}$.

This combination of characteristics makes it easily possible to produce cells comprising alignment layers presenting an inclined homeotropic alignment, notably without having to achieve an oblique evaporation of $SiO_x$ followed by treatment with a surfactant as is presently the case, these operations being particularly complicated and unsuitable for mass production.

The cell according to the invention may also advantageously be combined with control means comprising a system capable of generating a laser beam to form a thermally controlled display device.

Liquid crystal cells of this type can be used either in reflection mode or in transmission mode or also in transflection mode, depending on the application desired.

It will be noted that the cells of the invention have numerous interesting applications, for example as lenses for sunglasses, as glass for windows or also as simple temperature indicators.

Other features and advantages of the present invention will appear from study of the following detailed description of embodiments of the invention, given by way of non limiting example, with reference to the accompanying drawings in which:

FIG. 12 shows curves illustrating the influence of temperature on the threshold voltage and on the saturation voltage of the cells of the prior art and the cells of the invention respectively.

In the following description the same elements in the different figures bear the same reference numerals.

Firstly the principle of operation of a cell according to the invention will be described, reference being made to FIGS. 1 and 2.

Figure 1:
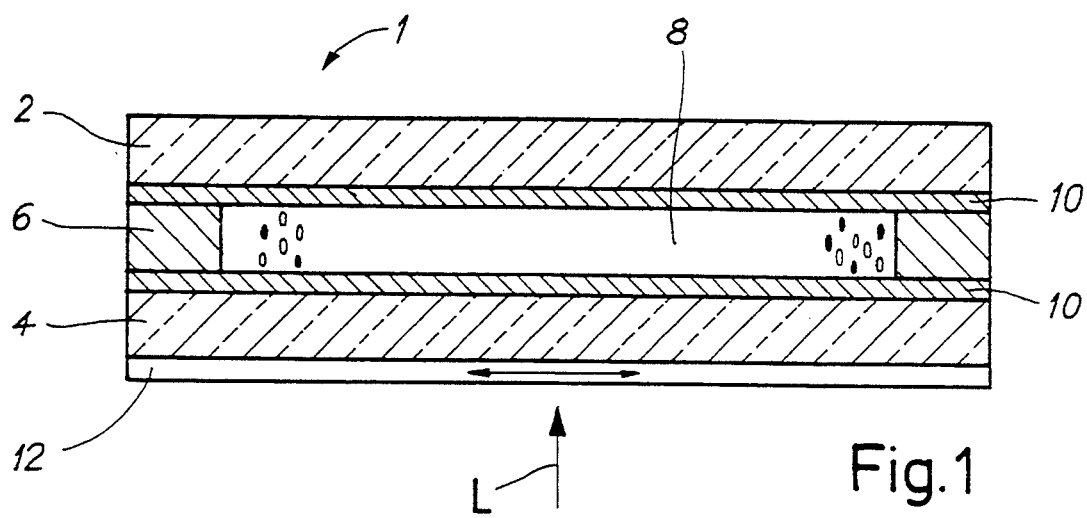
FIG. 1 is a transverse section of a liquid crystal cell of the invention.

FIG. 1 shows a liquid crystal cell of the Heilmeier type comprising a polarizer and functioning in the transmission mode. The direction of the light is represented by the arrow L.

The invention is naturally not limited to cells of this type, but can be applied to all other types of liquid crystal cells, such as cholesteric phase change liquid crystal cells, liquid crystal cells of the twisted nematic or super twisted nematic or cells using the effects of electrically controlled birefringence, these cells being capable of functioning either in the transmission mode or in the reflection mode or also in the transflection mode.

FIG. 1 shows a first embodiment of a liquid crystal cell of the invention designated by the general reference numeral 1. This cell 1 comprises two transparent glass plates, one front 2 and the other back 4, joined together by a sealed frame 6 defining a sealed volume in which a liquid crystal mixture 8 is contained. The front and back plates 2, 4 have an alignment layer 10 on their inside face and the back plate 4 has a polarizer 12 on its outside face.

On the two plates 2, 4, the alignment layer 10 is produced according to the invention using a soluble halogenated ethylenic polymer of the substituted ethylenic cycloaliphatic or heterocycloaliphatic type.

In the following description of the cells of the invention the alignment layer 10 was made using perfluoro substituted ethylenic cyclooxylaliphatic polymers. Polymers of this type are for example sold under the reference AF-1600 and AF-2400 by Du Pont de Nemours and are copolymers of tetrafluoroethylene (TFE) with bis-2,2-trifluoromethyl-4,5-difluoro-1,3-dioxole (perfluoro dimethyl dioxole, PDD).

More specifically, the polymer AF-1600 is a copolymer substantially comprising 60 to 70% PDD and 30 to 40% TFE and the polymer AF-2400 is a copolymer comprising 85 to 95% PDD and 5 to 15% TFE.

The alignment layer 10 of the cell of the invention is naturally not limited to the above described two copolymers of PDD and TFE and may be made using other copolymers of PDD and TFE in different proportions.

It would also be possible to use different copolymers of PDD and of monomers such as those described in U.S. Pat. No. 4,754,009, or also homopolymers of PDD. Similarly, copolymers of ethylenic substituted haloethylenic monomers and substituted heterocycloaliphatics with monomers such as those described in U.S. Pat. No. 4,754,009 may also be used.

In another embodiment, the alignment layer of the cell of the invention could be formed of a mixture comprising one of the above-described polymers, termed the first polymer, with a second polymer soluble in the same solvent, or else with a dispersion of a second polymer.

By way of example, the polymers AF-1600 and AF-2400 soluble in the same solvent, in this case in fluorinated solvents, can conveniently be mixed in proportions within their limit of solubility to form a homogeneous alignment layer.

If the second polymer is not soluble in the solvent used to dissolve the first polymer, this second polymer can advantageously be dispersed therein. In this case, the refractive index of the second polymer should be substantially identical to that of the first polymer so as to form a homogeneous and transparent alignment layer and may be different from that of the first polymer if it is desired to form a diffusing layer.

The alignment layer 10 was deposited, dried and brushed in the same direction on the two plates, and the polarization axis of the polarizer 12 is parallel to the direction of brushing. In addition, the liquid crystal mixture used in this example is a dichroic mixture with negative dielectric anisotropy sold by Merck under the reference ZLI-4530. This alignment layer couple AF-1600 and/or AF-2400 and the dichroic mixture ZLI-4530 is also used in the various embodiments of a cell of the invention which will be described in connection with FIGS. 3 to 5.

It will be noted that the drawing does not show the exact thickness of the assembly thus formed, this thickness being substantially exaggerated for greater clarity. More specifically, the distance between the two alignment layers is of the order of 5 to 9 micrometers and the thickness of the alignment layer is of the order of a few hundreds of angstroms. It will be noted in this connection that it is possible, according to another embodiment of the invention (not shown) to make alignment layers 10 of a thickness such that these layers are self supporting and that it is possible to dispense with the plates 2 and 3, the plates being constituted by the alignment layer itself.

Figure 2:
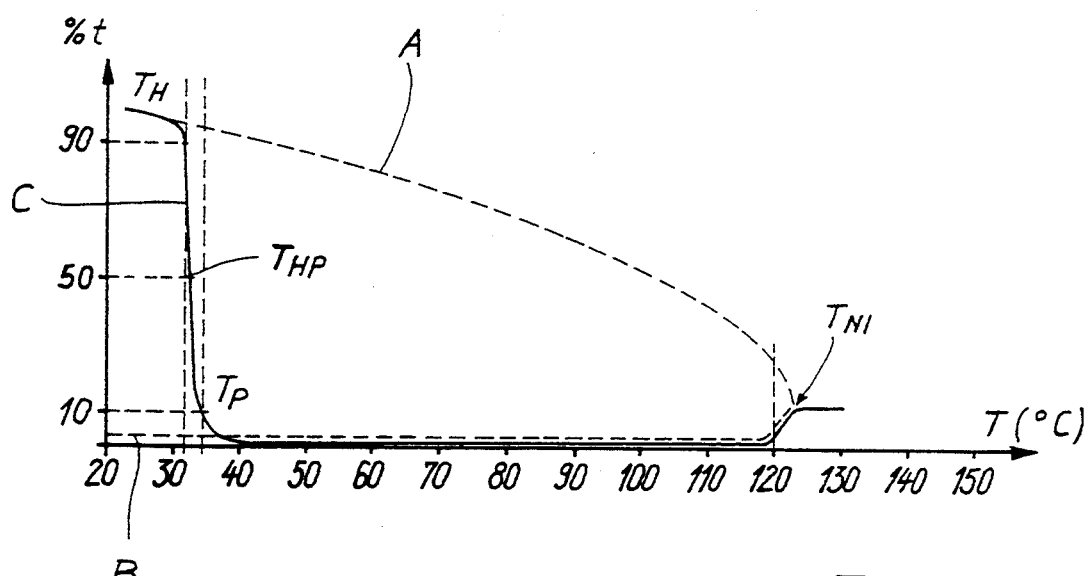
FIG. 2 represents the curves showing the variation of the transmission induced by the alignment layer of the invention as a function of temperature in comparison to the variation of the transmission induced by classic planar and homeotropic alignment layers as a function of temperature.

Referring now to FIG. 2, the curves A, B represent respectively variantion, as a function, of the temperature T of the transmission t of the light (indicated in %) through a conventional liquid crystal cell having a standard homeotropic alignment layer on each of its plates and through a conventional liquid crystal cell having a standard planar alignment layer on each of its plates.

The homeotropic alignment layers are prepared using octadecyldimethyl[3-(trimethoxysilyl)-propyl] ammonium chloride, better known under the abbreviation DMOAP and marketed by Petrach USA, and the planar alignment layers are prepared using a rubbed polyimide layer such as polyimide PI-2545 sold by Du Pont de Nemours.

The curve C represents the evolution as a function of the temperature T of the transmission t of the light through the liquid crystal cell 1 of the invention.

In these three examples, the liquid crystal cell does not have any control electrode.

It is apparent from curve A, that the transmission t of the corresponding cell diminishes progressively when the temperature rises, up to a temperature termed $T_{NI}$ corresponding to the transformation temperature of the liquid crystal from its nematic phase into its isotropic liquid phase. This progressive falls in the transmission results from the fact that the relative order of the liquid crystal molecules and of the molecules of dichroic dye-stuff fall substantially as a result of the thermal agitation of the latter.

According to curve B which relates to a cell having two standard planar alignment layers, it will be noted that the transmission t, virtually nil at ambient temperature, only varies very little as a function of temperature and rises very slightly before temperature $T_{NI}$.

As may be seen from curve C, the transmission behaviour of a liquid crystal cell according to the invention as a function of temperature is radically different from the transmission behaviour of the liquid crystal cells having standard homeotropic or planar alignment layers.

Referring to the temperature at which the cell transmits 90% of the light received as $T_H$, to the temperature at which the cell transmits 50% of the light received as $T_{HP}$ and to the temperature at which the cell transmits 10% of the light received as $T_P$, it will be found that there is a marked transition of the homeotropic or quasi homeotropic alignment to the planar or quasi planar alignment and that this transition occurs over a very small temperature interval. This temperature interval depends on various parameters which will be described in greater detail hereafter.

Quasi homeotropic alignment is understood to mean homeotropic alignment having a small angle of tilt which is given during the preparation by means of brushing a layer in such as manner that the tilting of the molecules occurs in a homogeneous direction. It should nonetheless be noted that below $T_H$ the angle of tilt becomes smaller as the temperature falls.

Quasi planar alignment is understood to mean planar alignment having a small angle of tilt which is also given by brushing the layer at the time of its preparation. This angle of tilt tends to become smaller when, above $T_P$, the temperature rises.

In the example shown, the transmission becomes progressively smaller down to the temperature $T_H$ as from which the alignment of the still homeotropic or quasi homeotropic liquid crystal suddenly becomes transformed to become planar or quasi planar at the temperature $T_P$. Alignment of this type then persists as far as the temperature $T_{NI}$.

This effect is reversible so that in cooling the cell of the invention the inverse sequence is followed and from the isotropic state when the temperature is higher than $T_{NI}$ one passes to a planar or quasi planar alignment when the cell is at a temperature between $T_P$ and $T_{NI}$, then to a homeotropic or quasi homeotropic alignment when the cell is at a temperature below $T_H$. This passage from the isotropic state to the homeotropic or quasi homeotropic state, passing through an intermediary state corresponding to a planar or quasi planar alignment occurs by passing through substantially the same curve as during heating. Slight hysteresis may appear which depends on the speed of heating respectively of cooling of the cell of the invention.

It will thus be noted that the alignment of the liquid crystal alignment induced by the standard homeotropic and standard planar alignment layers passes in reversible manner directly from the alignment considered in the isotropic state during elevation above respectively reduction below the temperature $T_{NI}$.

In contrast, the liquid crystal alignment induced by the alignment layer of the cell according to the invention passes successively and in reversible manner from homeotropic or quasi homeotropic alignment for a lower temperature below temperature $T_H$ to planar or quasi planar alignment for a temperature higher than the temperature $T_P$, then to the isotropic state when the temperature is higher than the temperature $T_{NI}$. The temperature interval comprised between $T_H$ and $T_P$ defines the reversible homeotropic-planar transition zone.

In the example illustrated by FIGS. 1 and 2, the liquid crystal presents negative dielectric anisotropy, but it goes without saying that the thermo-optical effect described hereinabove also works with liquid crystal mixtures having positive dielectric anisotropy.

This phenomenon can be explained by the fact that a rise or fall in temperature leads to a change in the orientation and/or conformation of the molecules of the aliphatic cycle of the polymer forming the alignment layer, in this case of the PDD, this change modifying the liquid crystal—polymer interaction forces which, in turn, influence the alignment of the molecules of the liquid crystal in the vicinity of the surface of the polymer.

These interaction forces depend on the polymer-liquid crystal couple used and as will be seen hereinafter, by carefully combining the alignment layers of the cell of the invention and different liquid crystal mixtures it is possible to chose a predetermined temperature $T_{HP}$ as a function of the desired application.

The first embodiment of the invention has particularly interesting applications in the automotive field, for example to manufacture the glass part of an automobile roof which becomes darker as a function of temperature. A cell of this type may also be used as temperature indicator, associated for example, with an optical detector to signal that a reference temperature has been exceeded.

Figure 3:
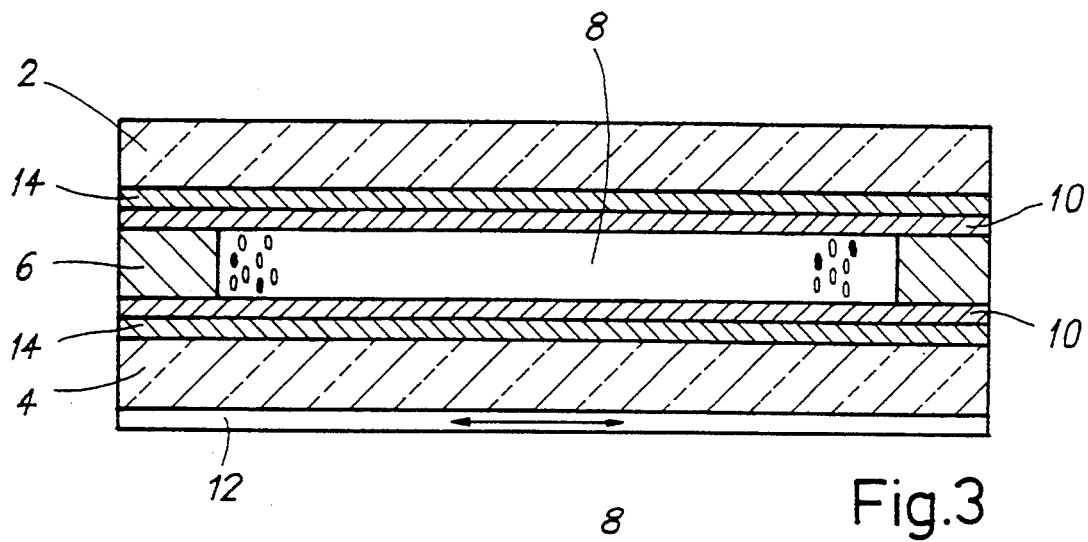
FIG. 3 shows a transverse section of a second embodiment of a liquid crystal cell of the invention provided with thermal control means.

Referring now to FIG. 3, this shows a second embodiment of a liquid crystal cell of the invention which can be thermally controlled.

The control means associated with this cell is, in this case, formed of two heating electrodes 14. Each electrode 14 extends over the entirety of the inside surface of a plate 2, 4 and is disposed between this inside face and the alignment layer 10 of the invention. This heating electrode is transparent and is advantageously made of a doped indium oxide (ITO) having high conductivity. Each electrode 14 is connected by means of two conductors to a source of direct current. Thus, when a current circulates in each electrode 14, heating occurs by the Joule effect of this latter and, by conduction, of the alignement layer of the cell. This makes it possible to vary in reversible manner the alignment of the liquid crystal as has been described in connection with FIGS. 1 and 2 and thus to achieve the darkening or lightening of a cell as a function of a thermal control signal.

Contrary to a first embodiment of a cell according to the invention, the reversible passage between the transparent and opaque states of which depends on the environmental temperature, a cell according to the second embodiment of the invention can be controlled independently of the surrounding temperature. A cell of this type may advantageously be used in any means using only two predetermined optical states such as an optical valve.

Figure 4:
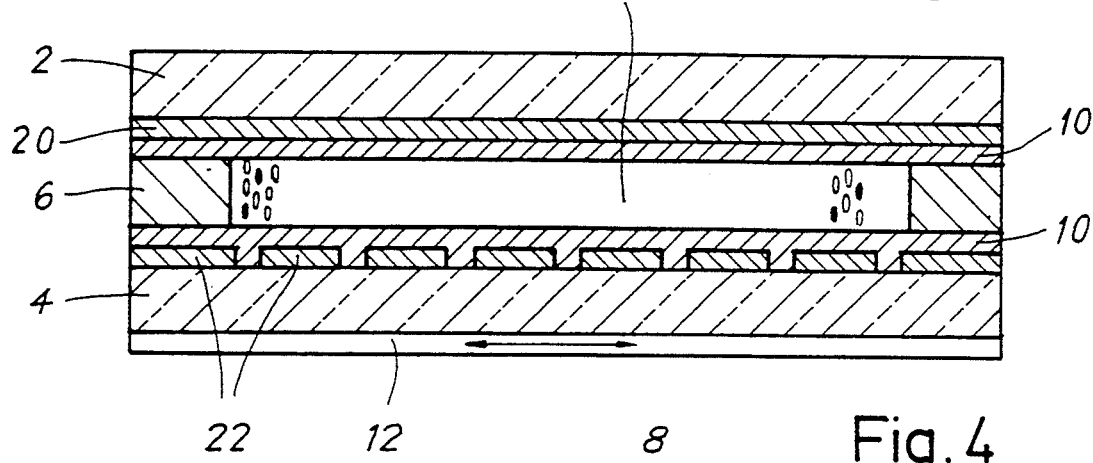
FIG. 4 shows a transverse section of a third embodiment of a liquid crystal cell of the invention comprising in addition electrical control means.

Referring now to FIG. 4, this shows a third embodiment of a liquid crystal cell of the invention which is, on the one hand temperature sensitive and which, on the other hand, many be electrically controlled.

In this embodiment, the plate 2 has an electrode 20 extending over the entirety of its inside face, whereas the plate 4 has an assembly of electrodes 22 electrically insulated from one another and defining a desired design. The electrodes 20, 22 are optically transparent and are advantageously made of doped indium oxide. The inside faces of the plates 2 and 4 as well as the electrodes 20, 22 which they carry are covered by an alignment layer 10 which, according to the invention, is made of a soluble fluorinated polymer. The electrodes 20, 22 are of course connected in suitable manner to a control circuit (not shown) designed to create an electrical field between these latter and to control tilting of the molecules of the liquid crystal mixture to change the optical state of the cell.

This type of liquid crystal cell therefore has, on the one hand, an optical state depending on the outside temperature and consequently functioning as the liquid crystal cell described in connection with FIGS. 1 and 2 and, on the other hand, an optical state capable of being electrically controlled by application of an electric field between the electrodes. It will therefore easily be understood that a combination of this type makes it possible to increase the potential applications of a cell of this type.

Nevertheless, the working of the cell of FIG. 4 differs according to the sign of the dielectric anisotropy of the liquid crystal.

Firstly the working of a cell of this type will be considered comprising a dichroic mixture of negative dielectric anisotropy.

It is assumed that the liquid crystal cell is initially at a temperature below the temperature $T_H$. The alignment of the liquid crystal is then homeotropic or quasi homeotropic and the optical state of the cell is transparent. To pass from this transparent optical state to an opaque optical state it is then possible either to increase the temperature of the cell above the temperature $T_P$ in such a way that the alignment layer induces planar or quasi planar alignment of the molecules of the mixture, or to apply an electric field between the electrodes to change the alignment orientation of the molecules of the mixture in such as way that these latter are perpendicular to the field. To pass from the opaque state to the transparent state it is sufficient, in the first case, to cool the liquid crystal cell to a temperature below $T_H$ and, in the second case, to stop applying the electric field.

When the liquid crystal displays positive dielectric anisotropy, the passage from the transparent optical state to the opaque optical state can only be effected by raising the temperature above the temperature $T_P$ in the same way as with a liquid crystal displaying negative dielectric anisotropy. It is then possible, in this case, to pass from the opaque optical state to the transparent optical state without cooling the cell, by applying an electric field in order to change the orientation of the molecules of the mixture and to make it parallel to the electric field.

A combination of these two effects is particularly interesting in certain applications such as for example in the case in which this cell equips the part of a glass window which has become obscured as a result of a high temperature but which one wishes to make lighter without waiting for the temperature thereof to fall below the temperature $T_H$.

Figure 5:
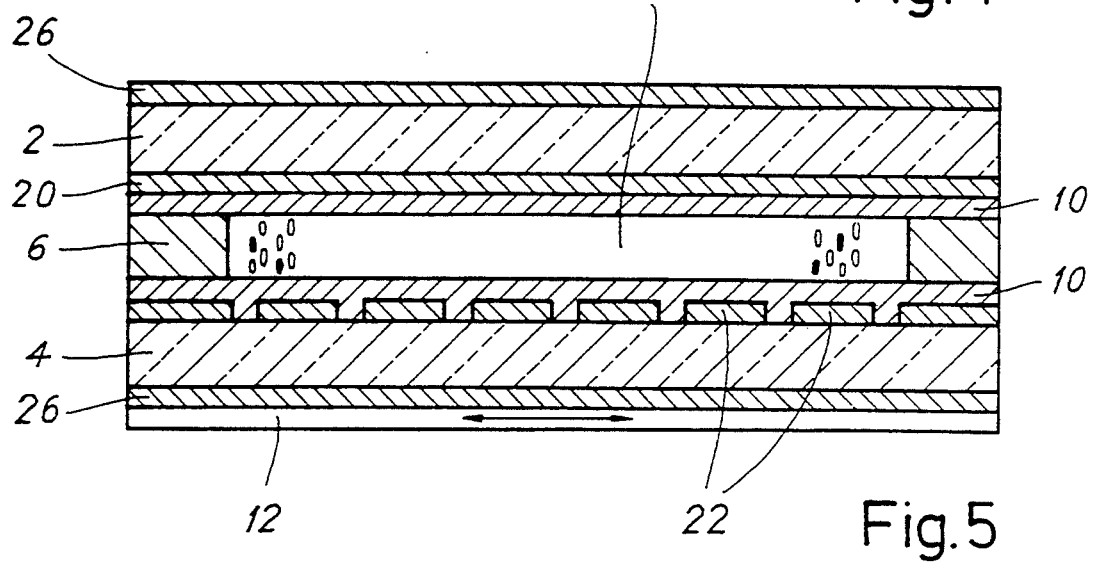
FIG. 5 shows a section of a fourth embodiment of a liquid crystal cell of the invention comprising both thermal control means and electrical control means.

FIG. 5 shows a fourth embodiment of a cell of the invention, the optical state of which varies as a function of the outside temperature and which can, moreover, be controlled thermally and/or electrically.

This cell has a structure identical to that of the liquid crystal cell described in connection with FIG. 4 except that the plates 2, 4 have in addition on their outside face a heating electrode 26 of the type described in connection with FIG. 3.

It will be noted that the cells of the invention and notably those which have just been described in connection with FIGS. 1, 3, 4 and 5, can comprise a substance absorbing within the infrared range. This substance can take the form of a layer (not shown) arranged for example between one plate and the alignment layer of the cell according to the invention or be directly mixed with the alignment layer or else dissolved in the liquid crystal.

These substances may be chosen from amongst infrared absorbing dyestuffs, such as the dyestuffs sold under reference IRG-022 and CY-9 by Nippon Kayaku or that sold by Mitsui under reference PA-1006.

The use of these substances absorbing within the infrared range makes it possible to increase the commutation speed of the cells of the invention by increasing the efficiency of the transformation of the energy of the infrared radiations, contained for example in solar radiation, into thermal energy.

Whereas in the four embodiments of a liquid crystal cell of the invention which have just been described the alignment layer extends over the entire surface of the plates, it is possible in each of these embodiments to deposit this alignment layer according to predetermined configurations, for example to display messages to be communicated. This message can indicate that a predetermined temperature has been exceeded by displaying this temperature directly on the cell.

It is also important to recall that the preceding description has been made in the context of a cell of the Heilmeier type having a transparent optical state when the alignment of the liquid crystal is homeotropic and in an opaque optical state when the alignment of the liquid crystal is planar.

It goes without saying that the reversible transition phenomenon from a homeotropic alignment to a planar alignment can be used in combination with other conventional optical or electro-optical effects (twisted-nematic, electrically controlled birefringence, etc . . . ).

In the embodiments of liquid crystal cells according to the invention described in connection with FIGS. 1 to 5, an alignment layer of the same type is located on both inside faces of the plates of the cell and what is involved is a "liquid crystal—alignment layer" couple is present having a predetermined transition temperature ($T_{HP}$ see FIG. 2).

Depending on requirements, it may be necessary to produce liquid crystal cells having different transition temperatures. It has, however, been proved possible to adjust the transition temperature $T_{HP}$ by varying the following parameters:

the nature of the alignment layer of the invention
the thickness of the alignment layer of the invention
the use of underlayers with the alignment layer of the invention
the nature of the liquid crystal or of the mixtures used in combination with an alignment layer of the invention
the combination of the alignment layers of the invention with standard planar or homeotropic alignment layers.

The dispersion of another material into the layer of alignment of the invention.

The influence of these various parameters is illustrated by the graphs of FIGS. 6 to 12.

Figure 6:
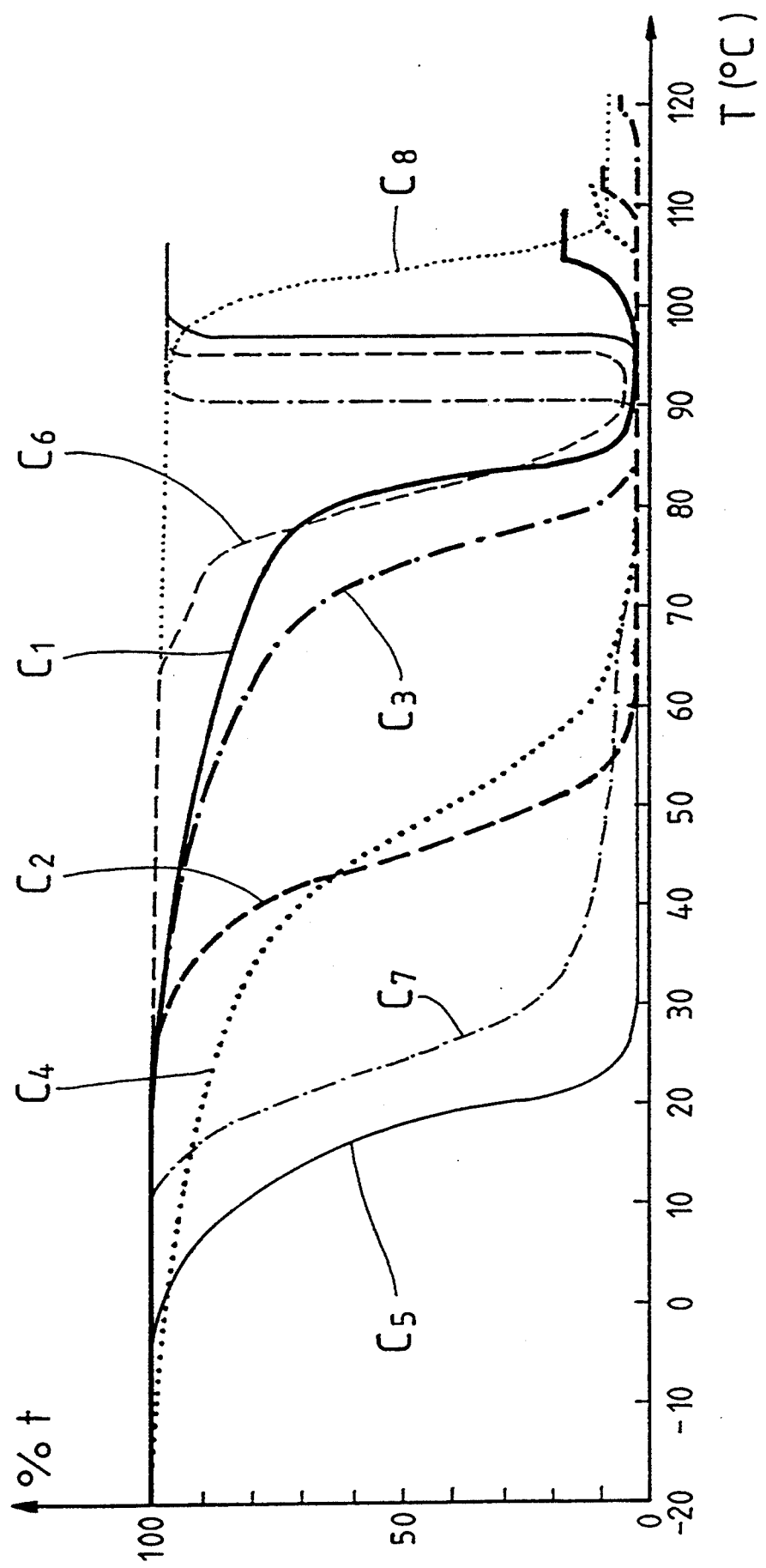
FIGS. 6 to 12 show curves illustrating the influence of various structural parameters of a cell according to the invention on the transition temperature.
Figure 7:
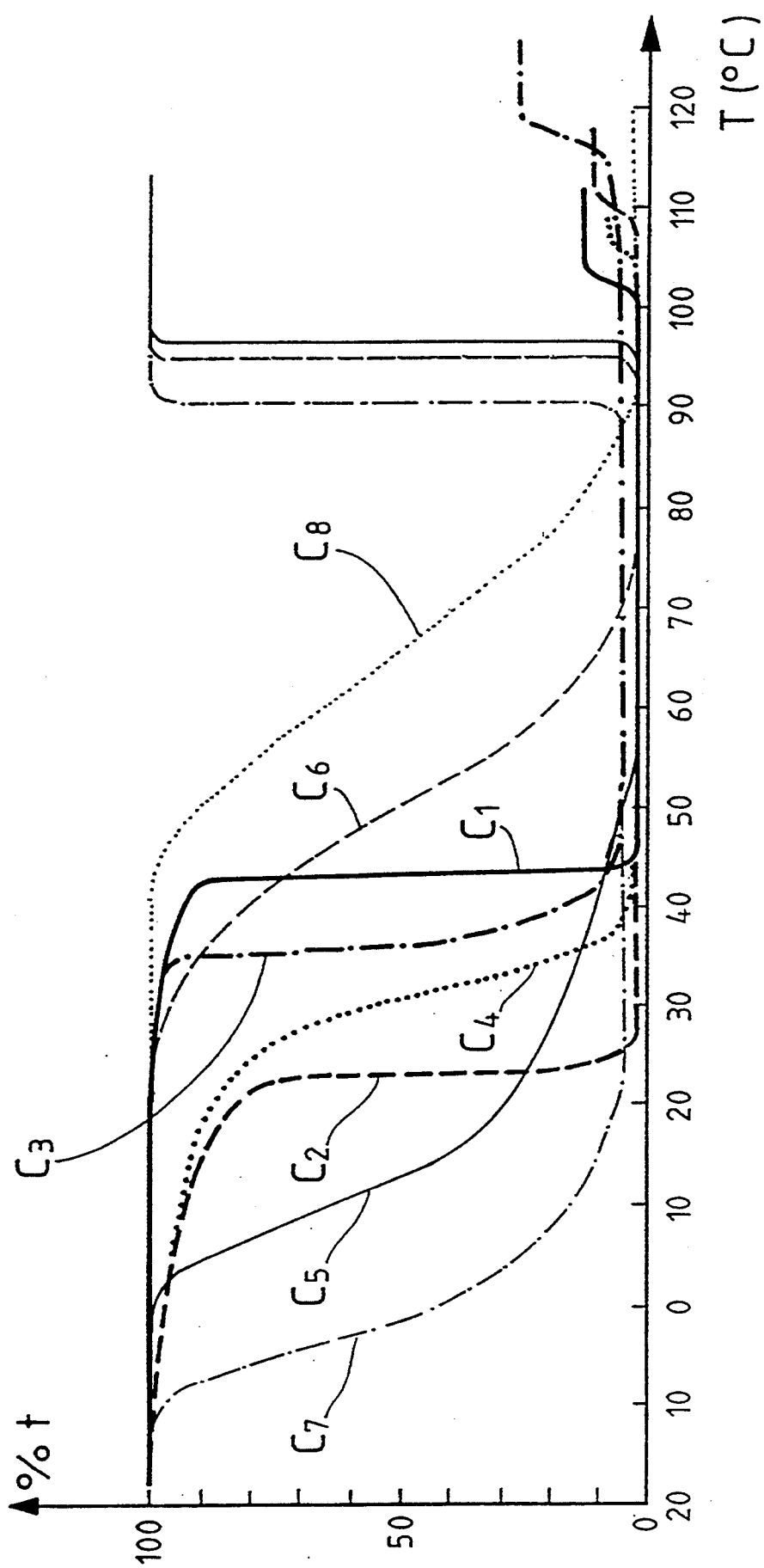

FIGS. 6 and 7 show the influence of the "liquid crystal—alignment layer" couple of the invention on the transition temperature $T_{HP}$.

This illustration shows two cells according to the invention, each plate of which has an alignment layer made respectively of a polymer sold by Du Pont de Nemours under the reference AF-1600 and AF-2400. Different liquid crystal mixtures have been used in the twisted nematic and dichroic type cells. Each liquid crystal mixture is designated by the reference under which it is marketed by Merck and is associated with a number on the curve. The transition temperatures obtained with each of these mixtures aligned along the AF-1600, AF-2400 layers have been set out in the table (I) hereinbelow:

TABLE (I)

| Curve | Liquid crystal | $T_{HP}$(°C.) AF-1600 see FIG. 6 | $T_{HP}$(°C.) AF-2400 see FIG. 7 |
| --- | --- | --- | --- |
| C1 | ZLI 4282 | 81.5 | 43 |
| C2 | ZLI 4480 | 45 | 19.5 |
| C3 | ZLI 4530 | 74 | 36.5 |
| C4 | ZLI 3284 | 46.5 | 30.5 |
| C5 | ZLI 4245 000 | 58 | 13 |
| C6 | ZLI 3239 | 81 | 50 |
| C7 | ZLI 3412 000 | 24 | −2 |
| C8 | ZLI 4268 | 104 | 64 |

The curves C1 to C4 correspond to liquid crystal mixtures comprising dichroic dyestuffs used in cells working in the Heilmeier mode and curves C5 to C8 correspond to liquid crystal mixtures that do not comprise a dyestuff which are used in cells working in the twisted nematic mode with two polarizers the polarization axes of which are parallel.

These curves clearly show that the transition temperature $T_{HP}$ can be adjusted over a wide temperature range as a function of the nature of the liquid crystal and of the alignment layer used therewith.

It will be noted that, with the alignment layer AF-1600, it is possible to chose the transition temperatures $T_{HP}$ in a temperature range varying substantially from the ambient temperature (24° C.) to 104° C.

With the alignment layer AF-2400, the transition temperatures are, with the same liquid crystal, lower than with the alignment layer AF-1600 and vary from −2° C. to 65° C. It will thus be noted that the temperature ranges within which the alignment is planar are wider with alignment layer AF-2400.

Figure 8:
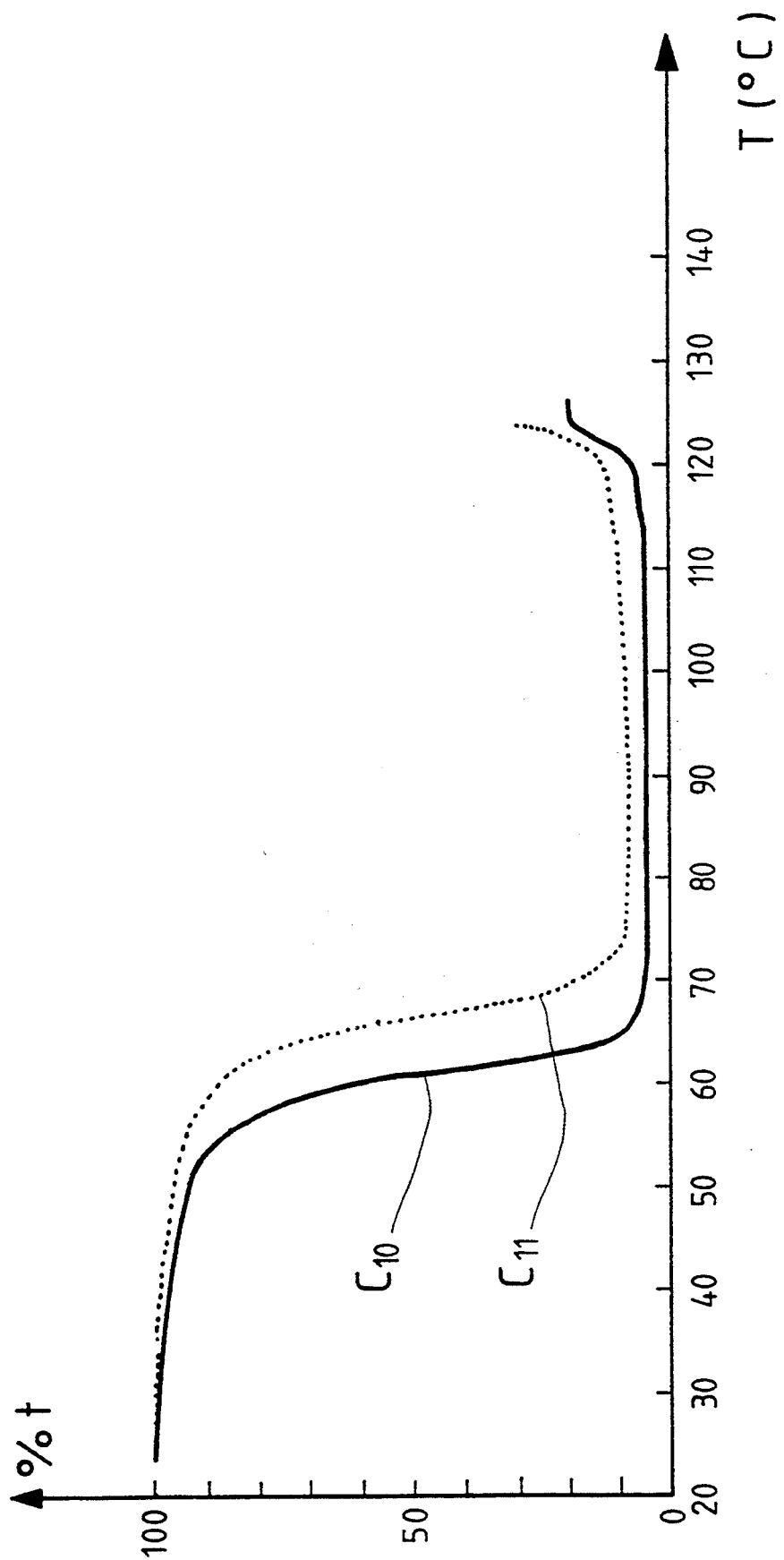

FIG. 8 shows the influence of the thickness of the alignment layer on the transition temperature $T_{HP}$. This influence has been illustrated by using three thicknesses of an alignment layer AF-1600 with a dichroic liquid crystal layer ZLI 4530 in Heilmeier mode. The curves C10, C11 correspond to thicknesses of the alignment layer AF-1600 of 80 nm and 60 nm respectively.

It follows from these curves that the transition temperatures $T_{HP}$ vary within a relatively small range (from 5° to 10° C.) and a very sudden transition in homeotropic alignment towards planar alignment is noted with the alignment layer.

Figure 9:
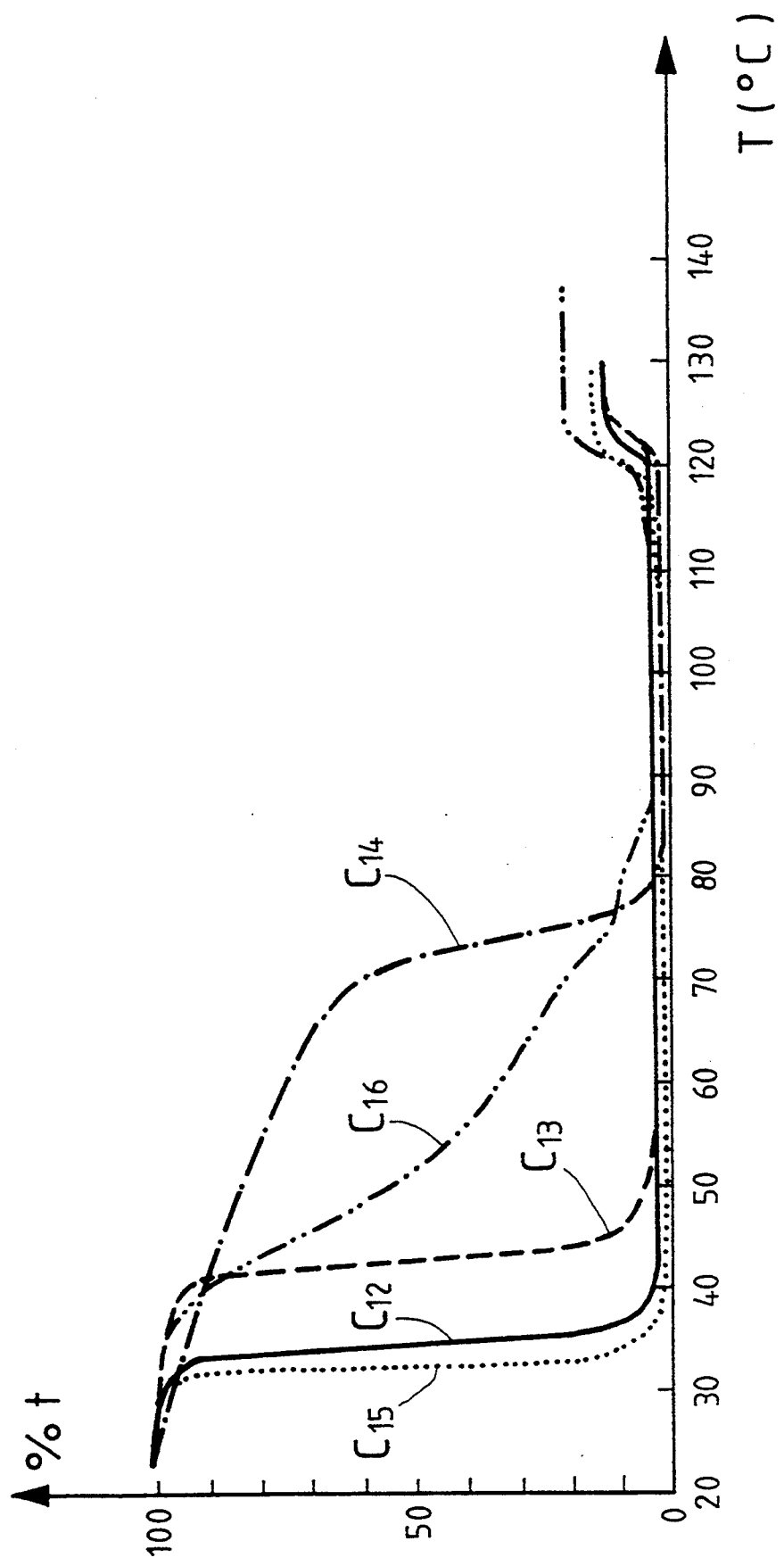

FIG. 9 shows the influence of using an underlayer with a main alignment layer on the transition temperature $T_{HP}$. Experiments have been conducted with the dichroic liquid crystal mixture ZLI 4530 in Heilmeier mode and the latter has been aligned along different combinations of alignment layers AF-1600 and AF-2400. The curves C12 and C13 correspond respectively to use in a cell of an alignment layer AF-2400 and AF-1600 on an underlayer of AF-1600 and AF-2400 respectively. The curves C14 and C15 correspond respectively to use in alignment layers AF-2400 and AF-1600 alone. Finally, curve C16 corresponds to use of an alignment layer AF-2400 on one plate and to use of an alignment layer AF-1600 on the other plate of the cell. The results obtained are set out in table (II) below:

TABLE (II)

| Curve | Alignment layer | Underlayer | $T_{HP}(°C.)$ |
|---|---|---|---|
| C12 | AF-2400 | AF-1600 | 34.5 |
| C13 | AF-1600 | AF-2400 | 42 |
| C14 | AF-1600 | Nothing | 72 |
| C15 | AF-2400 | Nothing | 32.5 |
| C16 | AF-1600/AF-2400 | Nothing | 51.5 |

It will be noted that use of different alignment layers on the two plates (curve C16) makes it possible to obtain intermediate transition temperatures in relation to the transition temperatures obtained using the same alignment layers on the two plates. It will also be noted that this type of asymmetrical alignment structure makes the transmission curve C16 of the cell more gradual than when one uses an alignment layer of the invention on its own or with an underlayer. It will also be noted that it is possible to adjust the transition temperature $T_{HP}$ by using an alignment layer with an underlayer (see curves C12 and C13).

Figure 10:
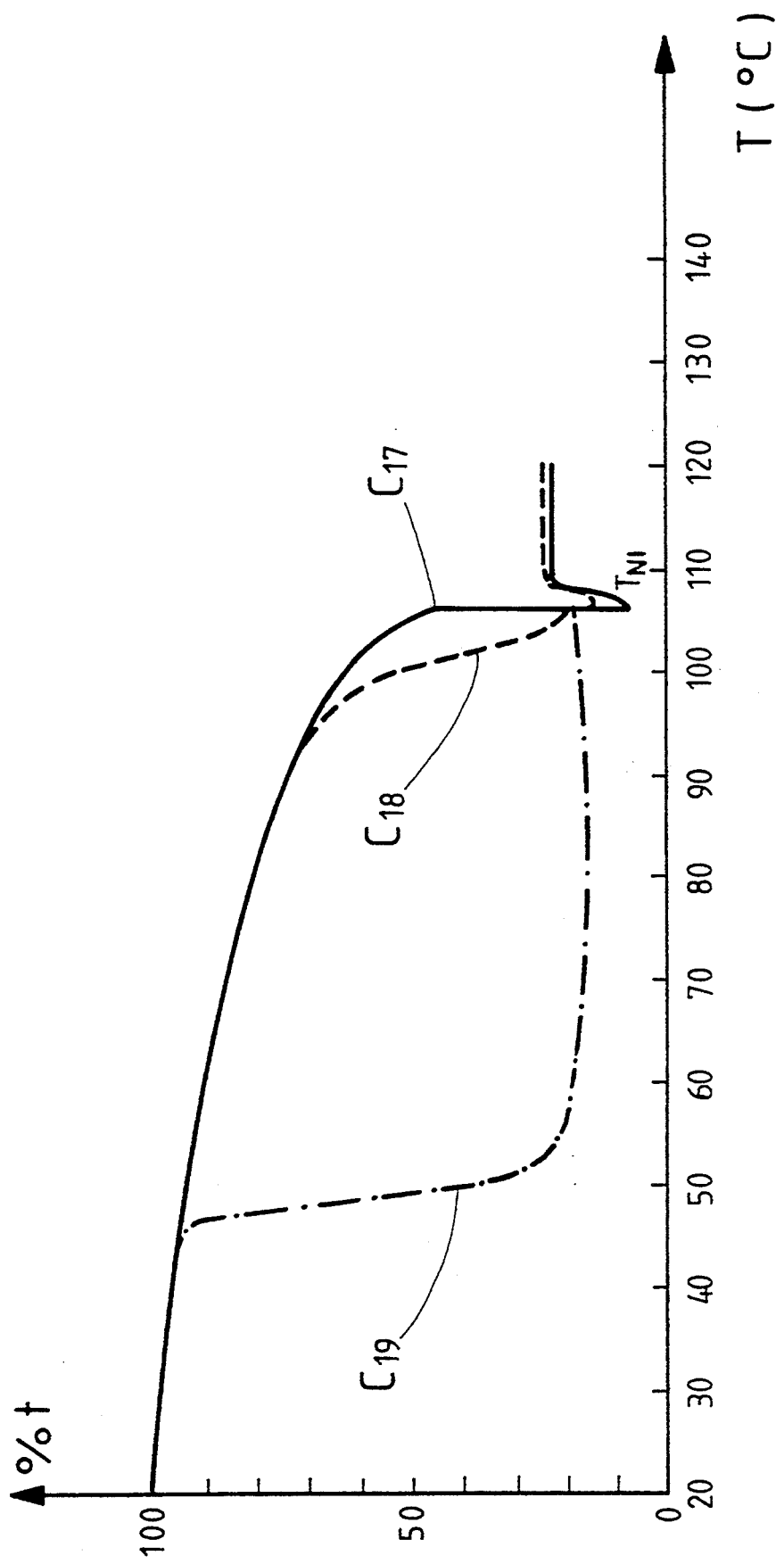

FIG. 10 shows the influence of using alignment layers of soluble fluorinated polymer in combination with conventional homeotropic alignment layers on the transition temperature $T_{HP}$.

The curve C17 shows the development as a function of temperature of the transparency of a cell comprising a conventional homeotropic alignment layer on its two plates. The curves C18 and C19 represent the development as a function of temperature of the transparency of a cell having on one plate a conventional homeotropic alignment layer and on the other plate an alignment layer according to the invention made respectively of soluble fluorinated polymer AF-1600 and AF-2400.

As may be seen in this figure, the alignment layers AF-1600 and AF-2400, combined with a standard homeotropic alignment layer always give a reversible homeotropic—planar transition. However, it will be noted in this case that the transition temperatures $T_{HP}$ are offset towards the higher values if they are compared with cells having the layers AF-1600 or AF-2400 on the two plates (see tables I and II). It will also be noted that the curve C18 follows the curve C17 until it approaches the temperature $T_{NI}$ in such a way that is it convenient, by brushing the fluorinated polymer layer, to hereby obtain inclined homeotropic alignment of the molecules of the liquid crystal mixture in the temperature range located between the crystallization temperature of the mixture and the reversible homeotropic—planar transformation temperature. It is thus advantageously possible to produce a cell having an inclined homeotropic alignment without using complicated and costly apparatus since the alignment layer of the invention can be deposited in solution as described in greater detail below.

It is of course also possible to combine an alignment layer of the invention with a conventional planar alignment layer. In this case, however, one obtains a gradual alignment of the molecules of the mixture between the two plates which align respectively in inclined and planar homeotropic mode. The alignment at the centre of the cell is thus average and the angle of tilt there is of the order of 45°.

Figure 11:
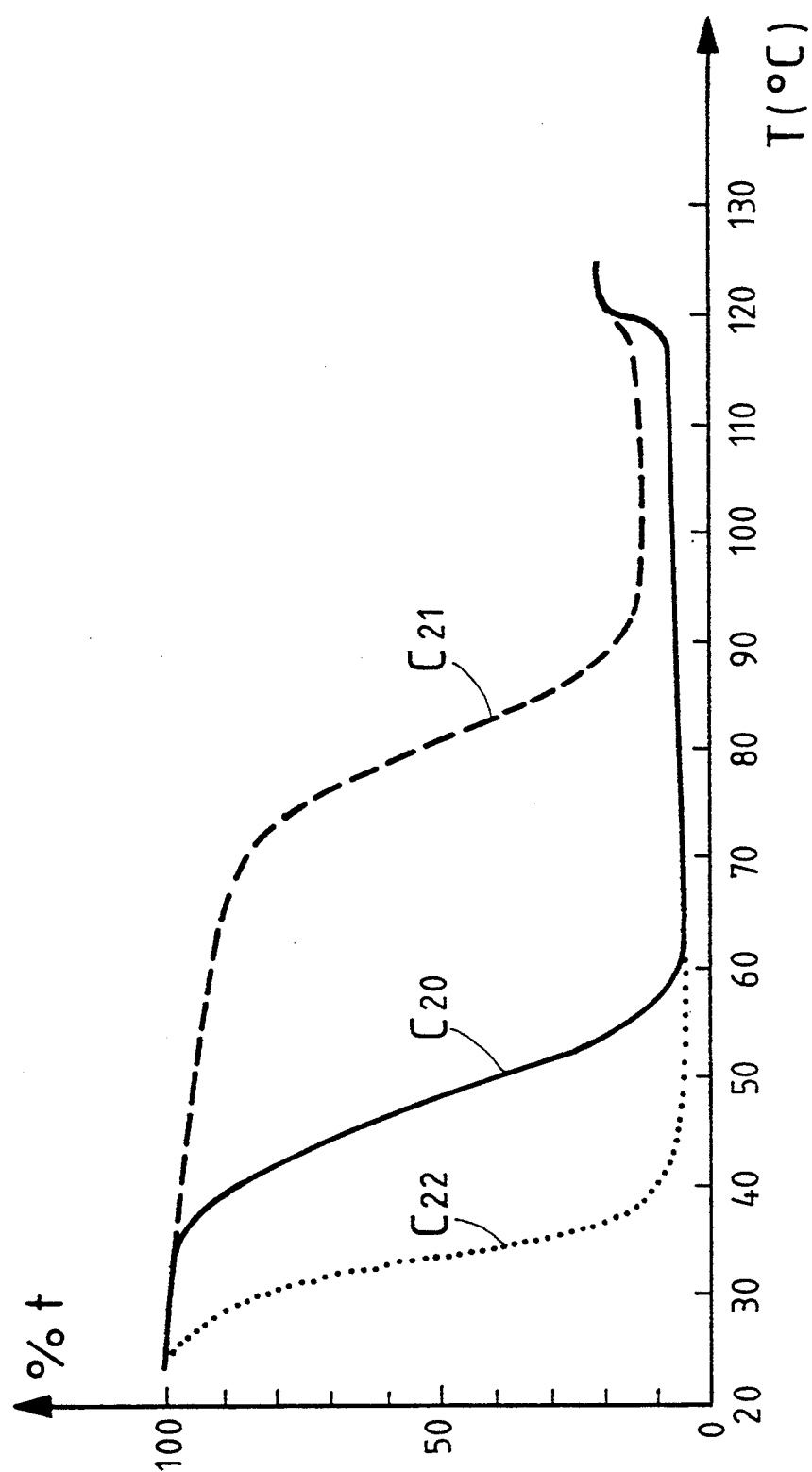

FIG. 11 shows the influence of using an alignment layer formed of a mixture of two halogen ethylenic polymers of the substituted ethylenic heterocycloaliphatic type or a polymer of this type with a dispersion of a second polymer. The curve C20 corresponds with a mixture comprising 25% AF-1600 and 75% AF-2400 whilst curves C21, C22 each correspond to a mixture of AF-1600 and AF-2400 respectively with dispersed polytetrafluoroethylene (PTFE) (10% by weight). The results obtained are set out in the table (III) below:

TABLE (III)

| Curve | Alignment layer | $T_{HP}(°C.)$ |
|---|---|---|
| C20 | AF-1600, AF-2400 | 48 |
| C21 | AF-1600, PTFE | 81 |
| C22 | AF-2400, PTFE | 33 |

It has been found on the basis of curve C20 that the transition temperature HP as well as the slope of the transmission curve is situated between the curves C3 of FIGS. 6 and 7 corresponding respectively to the alignment layers AF-1600 and AF-2400 used alone in such a way that an adjustment of the transition temperature can easily be chosen between the $T_{HP}$ of each of the two mixed alignment layers.

It will also be noted on the basis of the curves C21 and C22 that the use of an alignment layer of the invention with a dispersion of another polymer renders the transmission of the cell more gradual as a function of the temperature and substantially reduces the transition temperature $T_{HP}$ in relation to cells having only the alignment layer of the invention (see curves C3 of FIGS. 6 and 7).

In summary, it will be noted that it is possible to choose a predetermined transition temperature by varying the above described parameters independently or simultaneously.

As is well known to the man skilled in the art, substantial variations in temperature lead to variations in the threshold voltage (voltage corresponding to 10% of transmission) and of the saturation voltage (voltage corresponding to 90% of the transmission) of the liquid crystal cells which need to be suppressed.

In the prior art there are various ways of compensating this variation, such as electronic compensation, compensation by liquid crystal doped with chiral agents, the spiral path of which varies inversely to temperature. Nonetheless, these means are either complicated and costly, as in the case of the electronic means, or reduce the multiplexing rate of the cell.

It has now been found that a cell of the invention provided with electrodes and associated with a liquid crystal, where the ratio between its bend elastic constant $K_3$ and its splay elastic constant $K_1$ is greater than or equal to 1 at ambient temperature, i.e. around 20° C., and which presents a ratio $T_{HP}/T_{NI}$ less than or equal to ⅓ compensates automatically by means of the alignment layer for variations in the threshold and saturation temperature with temperature. In preferred manner, the ratio $K_3/K_1$ is greater than or equal to 1.5.

Whereas in the case of cells having standard alignment layers the slopes of the threshold voltage and of the saturation tension curves as a function of temperature are negative, those of the cells of the invention associated with a liquid crystal of $K_3/K_1 \geq 1$ at ambient temperature and of the ratio $T_{HP}/T_{NI} \leq$ at ⅓ are substantially zero within a large temperature range.

Figure 12:
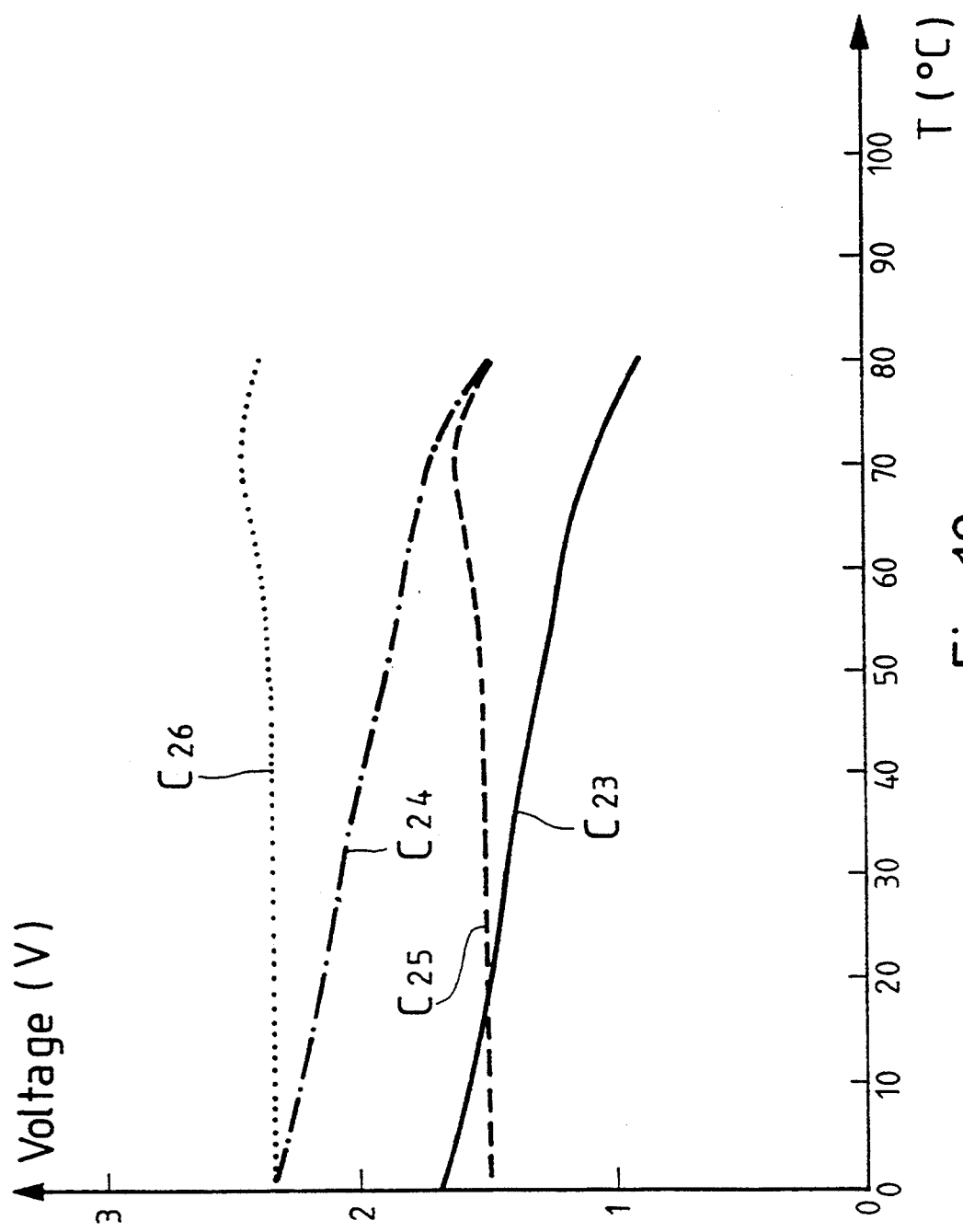

FIG. 12 shows curves representing respectively the behaviour of the threshold voltage and of the saturation voltage of standard cells and of the cells of the invention as a function of temperature.

In the example illustrated, the curves C23, C24 correspond to the results obtained with a standard cell (polyimide alignment layer) for the threshold voltage C23 and for the saturation voltage C24, and the curves C25, C26 correspond to the results obtained with a cell of the invention for the threshold voltage C25 and for the saturation voltage C26. The liquid crystal used in the two cells is a liquid crystal sold by Merck under reference ZLI 3201-000 presenting a $K_3/K_1 = 1.8$ and the ratio $T_{HP}/T_{NI}$ of the cell according to the invention is less than $-0.25$.

These curves show clearly that the threshold and saturation voltages of the cells of the invention are constant between 0° and 75° C. whereas these same voltages fall constantly within this temperature range with standard cells.

As has already been mentioned earlier, it is difficult or impossible for the person skilled in the art to make cells comprising homeotropic alignment layers that are inclined or slightly inclined without using costly and complicated technical means.

It has, however, been found that a cell of the invention comprising electrodes and associated with a liquid crystal, in which the ratio of the bend elastic constant $K_3$ to the splay elastic constant $K_3/K_1$ is less than or equal to 2, at ambient temperature, where the cell presents a ratio $T_{HP}/T_{NI}$ greater than or equal to ⅔, presents an inclined homeotropic alignment.

Examples of cells of the invention which present homeotropic alignment at ambient temperature are set out in the table (IV) hereinbelow:

TABLE (IV)

| Liquid crystal inclination | Alignment layer | $K_3/K_1$ | $T_{HP}$(°C.) | Angle (°) of |
|---|---|---|---|---|
| ZLI 3201-100 | /AF-1600 | 1.26 | 0.98 | ~1 |
| ZLI 3244 | /AF-1600 | 1.22 | 0.92 | ~1 |
| ZLI 2248 | /AF-2400 | 1.13 | 0.87 | ~1 |
| ZLI 3807 | /AF-2400 | 0.95 | 0.99 | ~1 |

This table shows that it is easy to obtain inclined homeotropic alignments with the cells of the invention. It will also be noted that the ratio $T_{HP}/T_{NI}$ of these cells is very close to 1 and that the temperature range within which the inclined homeotropic alignment is obtained is wide.

The ratio $K_3/K_1$ is less than or equal to 1.5.

Figure 13:
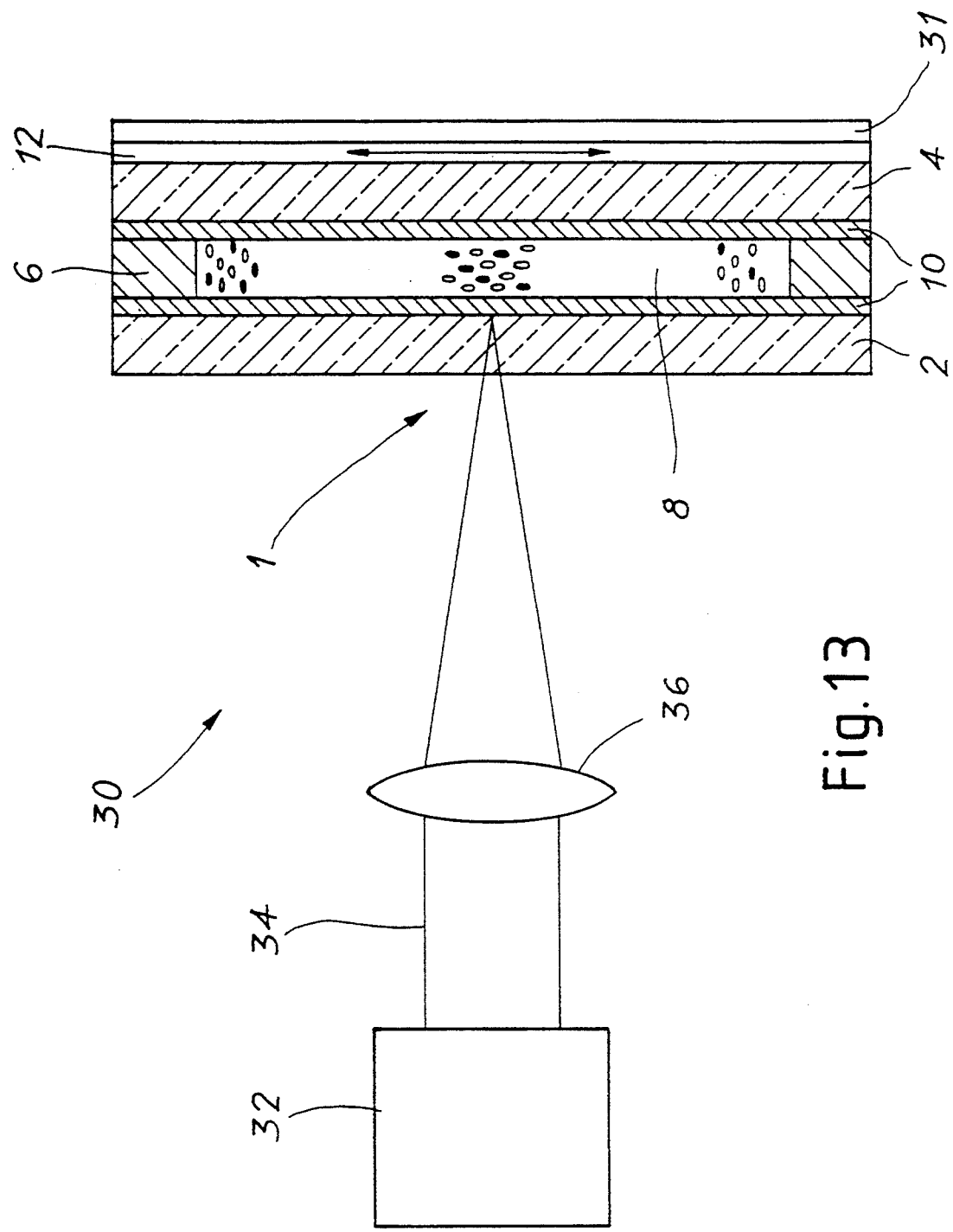
FIG. 13 shows in diagrammatic form a thermal control display device of the invention.

Reference is now made to FIG. 13 which shows a display device 30 of the invention. This device 30 comprises a liquid crystal cell identical to that described in connection with FIG. 1 comprising, in addition, a reflector 31. This cell is associated with control means 32 comprising a system capable of generating this laser beam 34 in combination with an optical system 36 for scanning and focussing the beam 34.

In a preferred embodiment of this device, the cell comprises a layer of infrared absorbing material (not shown) the absorption band of which is close to or identical with the emission wavelength of the beam 34.

In a device of this type, the energy of the beam 34 is transformed, with the help of an infrared absorbing layer, into thermal energy, leading to local heating of the alignment layer 20 which tilts the homeotropic alignment liquid crystal molecules into planar alignment as explained in connection with FIG. 2.

The invention relates to the application of a soluble halogenated ethylenic polymers of the substituted ethylenic cycloaliphatic or heterocycloaliphatic type in the field of liquid crystal cells to form an alignment layer. We will now describe, by way of example, a method of depositing a polymer of this type on a plate of a liquid crystal cell such as that shown in FIG. 4. In this example, the term substrate is understood to mean a plate of glass covered by one or several transparent electrodes made of doped indium oxide.

The substrate is first washed in a bath of alkaline detergent with ultrasonic stirring. The substrate is then rinsed in a stream of deionized water and then dried in a rinser drier and then in a fan oven at a temperature of about 90° for 30 minutes.

A solution of a copolymer of 1% by weight of a copolymer of PDD and of TFE is for example prepared in a mixture of solvents. A polymer manufactured under the name AF-2400 by Du Pont de Nemours and two solvents sold by 3M under the names Fluoroinert FC-43 and FC75 were used in the example. It is of course also possible to use just one solvent or any other solvent capable of dissolving this fluorinated polymer.

This 1% by weight solution is then deposited on the substrate using a spin coating machine at a speed of 3000 rpm for 20 seconds. The layer obtained is about 70 nm thick. The solvent is removed in a programmable fan oven according to the following programme: heating the substrate to 90° C. at a rate of 8° C./min, maintaining the substrate at 90° C. for 30 min, heating to 250° C. at a rate of 5° C./min, maintaining at 250° C. for 20 min and cooling to ambient temperature. After this treatment the substrate is brushed using a velvet-covered cylinder in order to induce an alignment in a homogeneous direction during variations in temperature.

Two substrates obtained are assembled according to this process by using an adhesive that hardens in ultraviolet light and by interposing, if necessary, spacers made of glass fibres of 9 μm diameter. A dichroic mixture ZLI 4530 manufactured by Merck is then introduced by capillarity and the cell is closed using adhesive. The cell obtained has a temperature-sensitive alignment.

In the case of a cell of the invention provided with a layer of material that absorbs within the infrared range this is deposited by dissolving the infrared absorbant in a solution of heat-stable polymer, for example in a polyimide and by depositing the solution obtained in conventional manner, i.e. using a spin coating machine.

The concentration of the absorbant in the polymer solution may vary as a function of the absorption desired and typically concentrations of 1 to 10% in solution are particularly preferred.

If the infrared absorbant is within the liquid crystal or within the alignment layer, it may be directly dissolved in these latter.

I claim:

1. A thermosensitive liquid crystal cell having a first plate, a second plate and a sealed frame disposed between the two plates to thereby form a sealed volume in which is contained an optically active material, said material comprising at least one liquid crystal, said cell further comprising control means for reversibly switching said optically active material between a first and a second optically distinguishable state, said control means comprising an alignment layer which changes its tilt angle as a function of temperature covering at least one of said plates and being composed of a polymer belonging to the family of soluble halogenated ethylenic polymers of the substituted ethylenic cycloaliphatic or hetero cycloaliphatic type, the optically distinguishable state of said optically active material being determined by the temperature of said alignment layer and said active material, and further comprising means for applying heat to said alignment layer.

2. A thermosensitive liquid crystal cell according to claim 1, wherein the polymer is fluorinated.

3. A thermosensitive liquid crystal cell according to claim 1, wherein the polymer is perfluorinated.

4. A thermosensitive liquid crystal cell according to claim 1, wherein the polymer is cyclooxyaliphatic substituted.

5. A thermosensitive liquid crystal cell according to claim 4, wherein the polymer is a copolymer of tetrafluorethylene with bis-2,2-trifluoromethyl-4,5-difluoro-1,3-dioxole.

6. A thermosensitive liquid crystal cell according to claim 5, wherein the said copolymer comprises about 60 to 70% of bis-2,2-trifluoromethyl-4,5-difluoro-1,3-dioxole and 30 to 40% of tetrafluoroethylene.

7. A thermosensitive liquid crystal cell according to claim 6 which is associated with a liquid crystal in which the ratio of its bend elastic constant with its splay elastic constant ($K_3/K_1$) is greater than or equal to 1 at ambient temperature and in which the ratio $T_{HP}/T_{NI}$ is less than or equal to $\frac{3}{4}$.

8. A thermosensitive liquid crystal cell according to claim 7, wherein the ratio ($K_3/K_1$) is greater than or equal to 1.5.

9. A thermosensitive liquid crystal cell according to claim 6, which is associated with a liquid crystal in which the ratio between its bend elastic constant and its splay elastic constant is less than or equal to 2 at ambient temperature and which presents a ratio $T_{HP}/T_{NI}$ greater than or equal to $\frac{2}{3}$.

10. A thermosensitive liquid crystal cell according to claim 9 wherein the ratio ($K_3/K_1$) is less than or equal to 1.5.

11. A thermosensitive liquid crystal cell according to claim 5, wherein said copolymer comprises about 85 to 95% of bis-2,2-trifluoromethyl-4,5-difluoro-1,3-dioxole and 5 to 15% of tetrafluoroethylene.

12. A thermosensitive liquid crystal cell according to claim 1, wherein the said copolymer comprises a mixture of the copolymers comprising about 60 to 70% of bis-2,2-trifluoromethyl-4,5-difluro-1,3-dioxole and 30 to 40% of tetrafluoroethylene.

13. A thermosensitive liquid crystal cell according to claim 1, wherein said polymer is mixed with a soluble second polymer or with a dispersion of a second polymer.

14. A thermosensitive liquid crystal cell according to claim 1, wherein said alignment layer comprises an underlayer of a different material.

15. A thermosensitive liquid crystal cell according to claim 14, wherein said underlayer is a polymer belonging to the family of soluble halogenated ethylenic polymers of the substituted ethylenic cycloaliphatic or hetero cycloaliphatic type.

16. A thermosensitive liquid crystal cell according to claim 1, and further comprising electrodes on each of said plates wherein said first and second state are further electrically controlled by means of a voltage applied to said electrodes.

17. A thermosensitive liquid crystal cell according to claim 16, wherein said electrodes cover the entire surface of each plate.

18. A thermosensitive liquid crystal cell according to claim 16 and further comprising a liquid crystal having a positive dielectric anisotropy wherein said cell is electrically controlled within the temperature range comprised between the homeotropic to planar transition temperature $T_{HP}$ and the nematic to isotropic transition temperature $T_{NI}$ of said liquid crystal.

19. A thermosensitive liquid crystal cell according to claim 16 and further comprising a liquid crystal having a negative dielectric anisotropy wherein said cell is electrically controlled within the temperature range comprised between the nematic to crystal transition temperature $T_M$ and the homeotropic to planar transition temperature $T_{HP}$ of said liquid crystal.

20. A thermosensitive liquid crystal cell according to claim 1, wherein the optically active material is a mixture of liquid crystals and of chiral components and which also comprises a polarizer on one of the plates.

21. A thermosensitive liquid crystal cell according to claim 1, which also comprises a substance absorbing within the infrared range.

22. A thermosensitive liquid crystal cell according to claim 20, wherein the substance absorbing within the infrared range takes the form of a layer arranged between a plate and the alignment layer.

23. A thermosensitive liquid crystal display device comprising a cell according to claim 1 wherein said means for applying heat comprise a system for generating a laser beam.

24. A thermosensitive liquid crystal cell according to claim 1 or claim 23 wherein said means for applying heat comprise means for applying heat to one or more discrete locations.

* * * * *